United States Patent [19]
Bowers

[11] Patent Number: 6,166,933
[45] Date of Patent: Dec. 26, 2000

[54] SNUBBER CIRCUIT FOR AN INVERTER HAVING INDUCTIVELY COUPLED RESISTANCE

[75] Inventor: Thomas J. Bowers, New Berlin, Wis.

[73] Assignee: Pillar Industries, Inc., Brookfield, Wis.

[21] Appl. No.: 09/411,415

[22] Filed: Oct. 1, 1999

[51] Int. Cl.$^7$ .................................................. H02H 7/122
[52] U.S. Cl. ............................................................ 363/56
[58] Field of Search .................................. 363/16, 17, 55, 363/56, 97, 98, 131, 132

[56] References Cited

U.S. PATENT DOCUMENTS

| | | | |
|---|---|---|---|
| 3,675,110 | 7/1972 | Kelly, Jr. | 321/14 |
| 4,561,046 | 12/1985 | Kuster | 363/21 |
| 4,760,512 | 7/1988 | Loftus | 262/20 |
| 4,899,270 | 2/1990 | Bond | 363/56 |
| 5,055,990 | 10/1991 | Miki et al. | 363/56 |
| 5,130,917 | 7/1992 | Shekhawat | 363/56 |
| 5,548,503 | 8/1996 | Motonobu | 363/56 |
| 5,633,579 | 5/1997 | Kim | 323/222 |
| 5,745,353 | 4/1998 | Sato et al. | 363/56 |
| 5,923,547 | 7/1999 | Mao | 363/52 |
| 5,986,904 | 11/1999 | Jacobs et al. | 363/53 |

*Primary Examiner*—Matthew Nguyen
*Attorney, Agent, or Firm*—Whyte Hirschboeck Dudek SC

[57] ABSTRACT

A snubber circuit is disclosed having a pair of series connected switches, each switch having a capacitor in parallel with the switch. The snubber circuit includes a coupling element, such as a coil winding, or air-core transformer, in close proximity to a branch circuit having the capacitor therein. The coupling element is connected to a resistor and inductively couples the resistor in series with the capacitor in the branch circuit. The resistor is preferably located remotely from the capacitor. Therefore, a relatively high value, high power-rated resistor can be inductively coupled by the coupling element into the branch circuit in series with the capacitor without introducing additional inductance into the branch circuit. The invention is particularly useful in physically constricted snubber circuit arrangements and permits the use of readily available discrete resistors with the desired power rating to obtain the desired equivalent induced resistance. The snubber circuit effectively reduces oscillations that are caused by the switching of the switches in the snubber circuit.

32 Claims, 3 Drawing Sheets

SNUBBER CIRCUIT FOR AN INVERTER HAVING INDUCTIVELY COUPLED RESISTANCE

BACKGROUND OF THE INVENTION

The present invention relates generally to snubber circuits, and more particularly to a snubber circuit which utilizes an inductively coupled resistance to dampen oscillations in the snubber circuit while minimizing added inductance.

In conventional power inverters, a pair of power switches connected in series between positive and negative DC terminals are utilized to operate during opposite half cycles to provide an AC output. Snubber circuits are often used to reduce the voltage spikes and power losses that occur as a result of turning the power switches on and off. The snubber circuits absorb the voltage spikes, and therefore reduce the power losses and overall switching losses that result from repeatedly switching the power switches.

In many inverter applications, snubber circuits include capacitors which are placed directly across the switching devices in parallel in order to reduce switching losses. One problem with this arrangement is that the capacitor, while greatly reducing the switching losses, creates an oscillatory circuit when placed in parallel to a DC power bus. The result is unwanted "ringing" in the circuit. FIG. 1 shows an example of a prior art snubber circuit 10 in which electrical oscillations or ringing occurs as a result of switching switches S1 and S2. The oscillations occur along the paths indicated by arrows 12, 14 and 16 at a frequency related to stray inductance L1 and the series capacitance combination of C1, C2 and filter capacitor $C_f$.

It has been found that placing a resistor in series with snubber capacitors C1 and C2 significantly reduces the oscillatory ringing in high frequency switching circuits. However, in the case of high frequency inverter circuits which utilize IGBT switches, the use of such resistors in snubber circuits is limited because of the high power requirements of the inverter circuits. Particularly in industrial applications, such a resistor placed in series with the capacitor must not only have a high power rating and a low inductance, but it must be a relatively low value component. The use of such resistors in high power snubber circuits is commercially impractical because of the lack of readily available low value resistors having the required high power rating.

Moreover, certain packaging and other physical limitations exist with respect to the amount of space between the capacitor and the DC power bus. In some applications, it is not feasible to physically fit such a discrete resistor with the required power rating in the snubber circuits from a manufacturing point of view, given limited space constraints. Additionally, a resistor with such high power ratings dissipates heat such that it is necessary to water cool the resistor. This, in turn, requires an even larger space for any associated cooling apparatus for the resistor.

Further, in a typical inverter, inserting a small value resistor in series with the capacitor introduces a significant amount of inductance into the snubber circuit.

Therefore, it would be desirable to have a snubber circuit that 1) inductively couples a resistor to induce a series resistance with a snubber capacitor to reduce circuit switching losses and oscillations without introducing additional inductance, 2) utilizes high power/high value resistors that are economical and commercially available, and 3) avoids the physical limitations of introducing such a resistor into the wire leads of the snubber capacitor.

SUMMARY OF THE INVENTION

The present invention provides a snubber circuit that overcomes the aforementioned problems, such that the desired series resistance in the snubber circuit may be obtained with a conventional, readily available resistor, particularly in a physically constricted arrangement.

In accordance with one aspect of the invention, a snubber circuit comprises at least one switch having at least two terminals defining a current path therethrough, and a branch circuit connected across the current path of the at least one switch. A snubber capacitor is connected in parallel with each of the at least one switches in the branch circuit. An inductive coupling element is inductively coupled to the branch circuit. A resistor is connected to the inductive coupling element in the branch circuit such that the inductive coupling element inductively couples the resistor to the branch circuit, which induces a resistance in series with the snubber capacitor, thereby dampening electrical oscillations within the snubber circuit.

In accordance with another aspect of the invention, the snubber circuit includes at least one switch that is connected in parallel with a heating coil to direct and divert power to sections of the heating coil. A coupling element is in close physical proximity to the branch circuit having the snubber capacitor. A resistor is connected to the coupling element such that the coupling element couples the resistor to the branch circuit having the snubber capacitor, to induce a resistance in series with the snubber capacitor.

In accordance with another aspect of the invention, an inverter comprises a power source with a snubber circuit connected to the power source. The snubber circuit includes a plurality of transistor switches, with a capacitor in parallel with each transistor switch. A coupling element is disposed in close physical proximity to each capacitor. A resistor is connected to each coupling element such that the coupling element induces a resistance in series with each capacitor.

The invention also contemplates a method of dampening oscillations in a power inverter switching circuit having at least one switch to direct power. The method comprises the steps of connecting a branch circuit to the at least one switch, with the branch circuit having capacitance in parallel with the current flow through the switch, and inductively coupling the resistor having a discrete value to the branch circuit such that a resistance is induced in the branch circuit that is less than the discrete value of the resistor to dampen circuit oscillations.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 2:
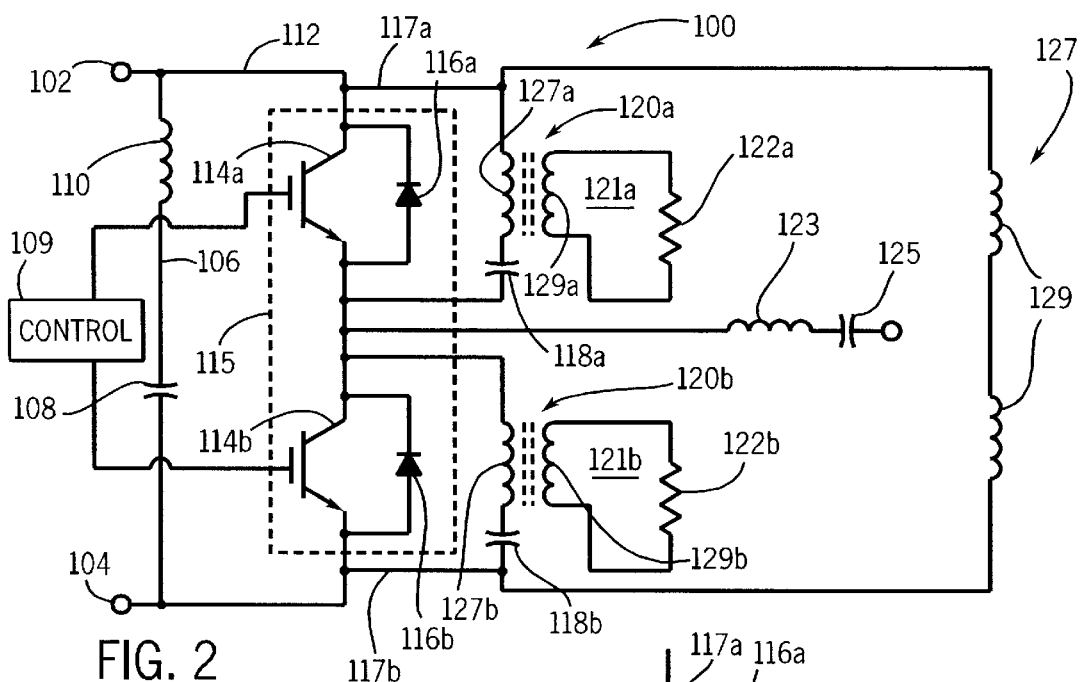
FIG. 2 is an electrical schematic of a snubber circuit in accordance with the present invention.

Referring now to FIG. 2, the snubber circuit according to the present invention is shown generally as 100. The snubber circuit 100 includes input terminals 102 and 104, which are to be connected to a source of power, such as a DC power bus (200 of FIGS. 5–6). Between input terminal 102 and 104 is a filter circuit 106, which includes capacitor 108 and an inductor 110. The capacitor 108 is used to filter any noise or AC component of the DC power supplied by the power bus. The inductance 110 is in series with capacitor 108, and is merely representative of any stray inductance which may be present in filter circuit 106. Extending from filter circuit 106 is switching circuit 112, that includes switches 114a and 114b connected in series with one another. Preferably, switches 114a and 114b are insulated gate bi-polar transistors (IGBT). However, it is contemplated by the present invention that any switching device, for example, SCRs, may be suitable for use with the present invention. Each switch 114a and 114b has a diode 116a and 116b connected in parallel across each of the switches 114a and 114b. Switches 114a and 114b together act as a bi-directional switch 115. Control 109 regulates the switching of switches 114a and 114b. Diodes 116a and 116b establish a current path when switches 114a and 114b are turned off and are commonly referred to as free-wheeling diodes. Branch circuits 117a and 117b are connected across the current paths of each switch. Snubber capacitors 118a and 118b are each placed in one of branch circuits 117a and 117b, and are each connected in parallel across one of switches 114a and 114b. The parallel placement of capacitors 118a and 118b directly across switches 114a and 114b, respectively, significantly reduce switching power losses. Capacitors 118a and 118b maintain a relatively low voltage across switches 114a and 114b. The capacitors 118a and 118b also provide a low impedance path for current to flow when the switches 114a and 114b are not in conduction (i.e. turned off). The result is that the voltage across each switch is relatively low as the current through each switch decreases to zero. The low voltage condition upon turn-off is the reason for the significant reduction in power losses due to switching, particularly at high operating frequencies, for example, 25 kHz and higher.

To obtain the desired induced resistance, coupling elements such as air core transformers 120a and 120b are utilized. Air core transformers 120a and 120b include primary windings 127a, 127b and secondary windings 129a, 129b, and are placed adjacent to and in close physical proximity of branch circuits 117a, 117b, respectively, and in series with capacitors 118a and 118b. The physical implementation of the primary winding may preferably include placing, or "sandwiching," of each air core transformer between the terminals of each capacitor as will be further described with reference to FIGS. 5 and 6. Although an air core transformer is shown and preferred, a mutually coupled coil or other winding, as well as an iron core transformer, may also be utilized.

The purpose of each air core transformer 120a and 120b is to induce a resistance in series with each of the capacitors 118a and 118b. By selecting an air core transformer or other coupling element with a particular primary winding to secondary winding turns ratio, preferably less than one, a practical, commercially available, low-cost resistor may be used with the air core transformer to induce the desired resistance into the branch circuit. To do so, resistors 122a and 122b are connected to the secondary branches 121a and 121b of air core transformers 120a and 120b. Again, air-core transformers 120a and 120b preferably have a primary winding to secondary winding ratio that is less than one such that larger value resistors may be used. Other factors that are considered in selecting the value of resistors 122a and 122b include the inductance of the air-core transformer or mutually coupled coil, and the oscillatory frequency of the snubber circuit prior to introducing the resistors.

Preferably, the value of discrete resistors 122a, 122b, in the present embodiment, is approximately 20 ohms in order to obtain the desired induced resistance in branch circuit 117a, 117b. Load inductance 123 and load capacitance 125 may also influence the size and location of resistors 122a and 122b. The resistors are selected such that the induced resistance does not significantly increase the inductance of the circuit. This arrangement allows the resistors 122a and 122b to be of a higher value and power rating than what would be required if the resistors were directly connected in series with capacitors 118a and 118b, respectively. Because resistors 122a and 122b are electrically isolated, and in a preferred embodiment remotely located, from snubber circuit 100, any inductance associated with the resistors 122a and 122b does not add to the inductance of the overall circuit 100. In the case of a restricted physical implementation, the resistors are preferably remotely located to conserve space near the circuit 100. The present invention eliminates the need to place each resistor 122a and 122b physically in series with each capacitor 118a and 118b. Additionally, heating inductance 127, made up of heating coils 129, is connected in parallel to bi-directional switch 115 to direct and divert power to sections of the heating coils 129. Although not specifically shown, it is contemplated that a plurality of bi-directional switches 115 may be utilized to selectively control temperature in the heating coils 129.

Figure 1:
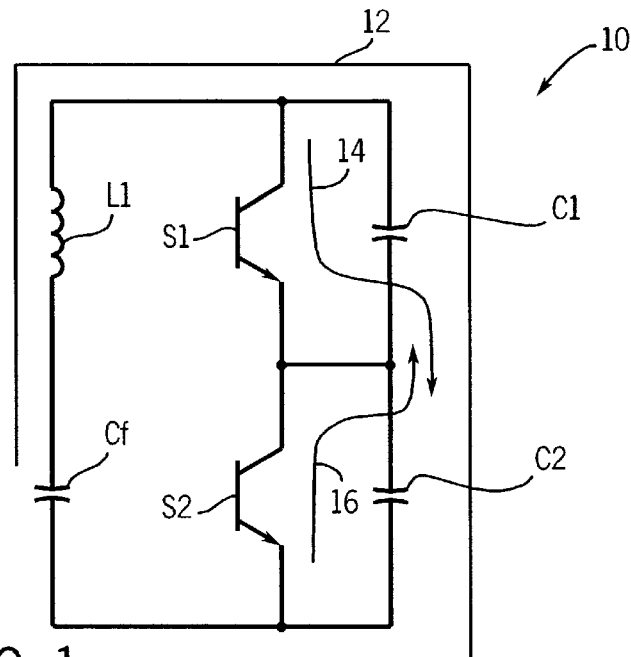
FIG. 1 is a prior art snubber circuit showing electrical oscillation paths.
Figure 3:
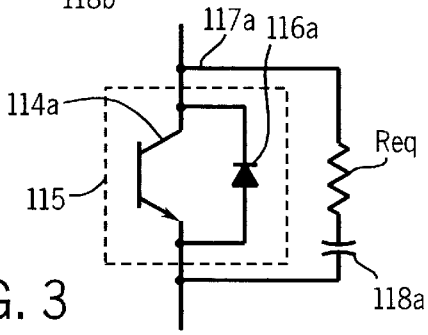
FIG. 3 is an electrical schematic of an equivalent circuit of the snubber circuit of FIG. 2 showing an equivalent resistance in series with the snubber capacitor.

Referring now to FIG. 3, a portion of an equivalent circuit of resistors 122a, 122b is shown. The resistance $R_{eq}$ is the equivalent resistance induced in series with capacitor 118a as a result of, from FIG. 1, resistor 122a connected to air-core transformer 120a, and similarly, the equivalent of resistor 122b connected to air core transformer 120b. Equivalent resistance $R_{eq}$ is not a discrete element, but is representative of the net series resistance in branch circuit 117a. It is desired to induce an equivalent resistance $R_{eq}$ of less than one ohm, and preferably between 0.2 to 0.5 ohms, in series with each capacitor such as 118a. However, in the particular embodiment shown, because of space limitations, cooling constraints, and non-readily available rated resistors at such high power levels, it is commercially impractical to place such a resistance directly in series with the capacitors. Equivalent resistance $R_{eq}$ is also induced in series with capacitor 118b (of FIG. 1) in a similar manner, although the equivalent resistance in series with each capacitor may not necessarily be equivalent to one another.

Figure 4:
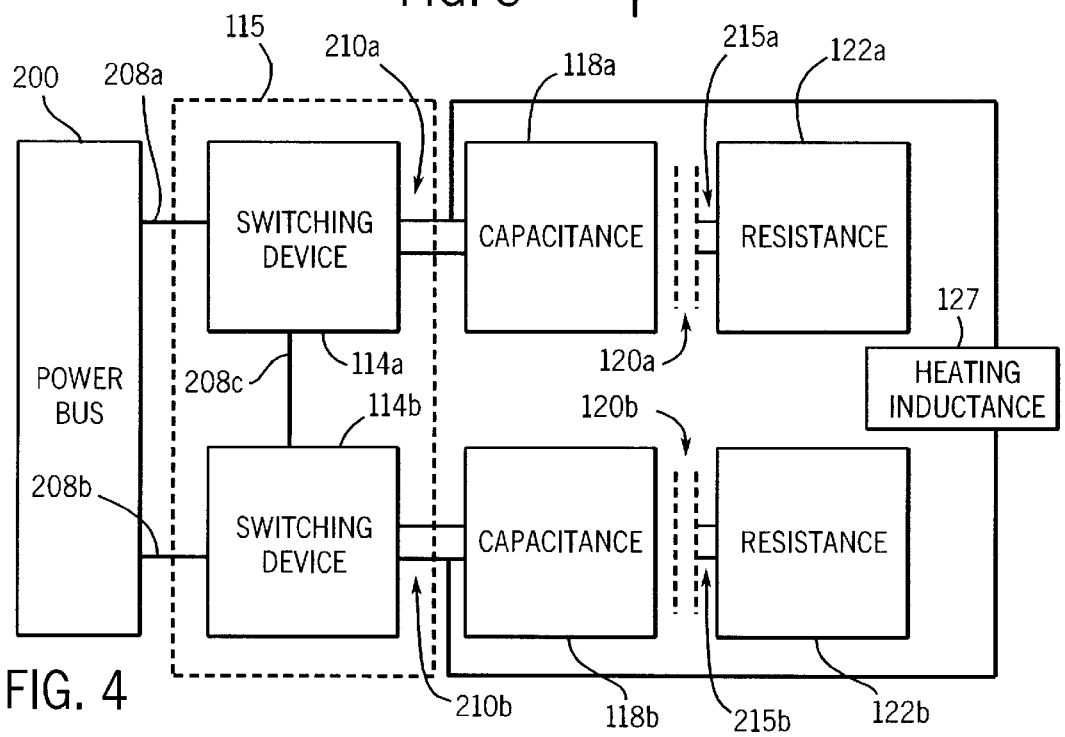
FIG. 4 is a block diagram showing the functional associations of the snubber circuit of FIG. 2 in accordance with the present invention.

Referring now to FIG. 4, a block diagram of the present invention is shown. Specifically, a power bus 200 distributes generated power to snubber capacitors 118a and 118b via connections 204a and 204b, respectively. Each switching device 114a and 114b has a respective connection 208a and 208b to power bus 200, and the switching devices are connected to one another by connection 208c. As previously described, the switching devices 114a and 114b may encompass any suitable bi-directional switch that is appropriately rated for the snubber application. Snubber capacitors 118a and 118b are connected via parallel connections 210a and 210b to switching devices 114a and 114b, respectively. Resistances 122a and 122b, in the form of discrete resistors, are isolated from the snubber capacitors 118a and 118b by inductive coupling elements 120a and 120b. The resistors are each connected to the coupling elements 120a and 120b by connections 215a and 215b such that resistors 122a and 122b may be remotely located from the remainder of the snubber circuit due to the space limitations near the snubber capacitors 118a and 118b. Heating inductance 127 is connected to switching devices 114a–b.

Figure 5:
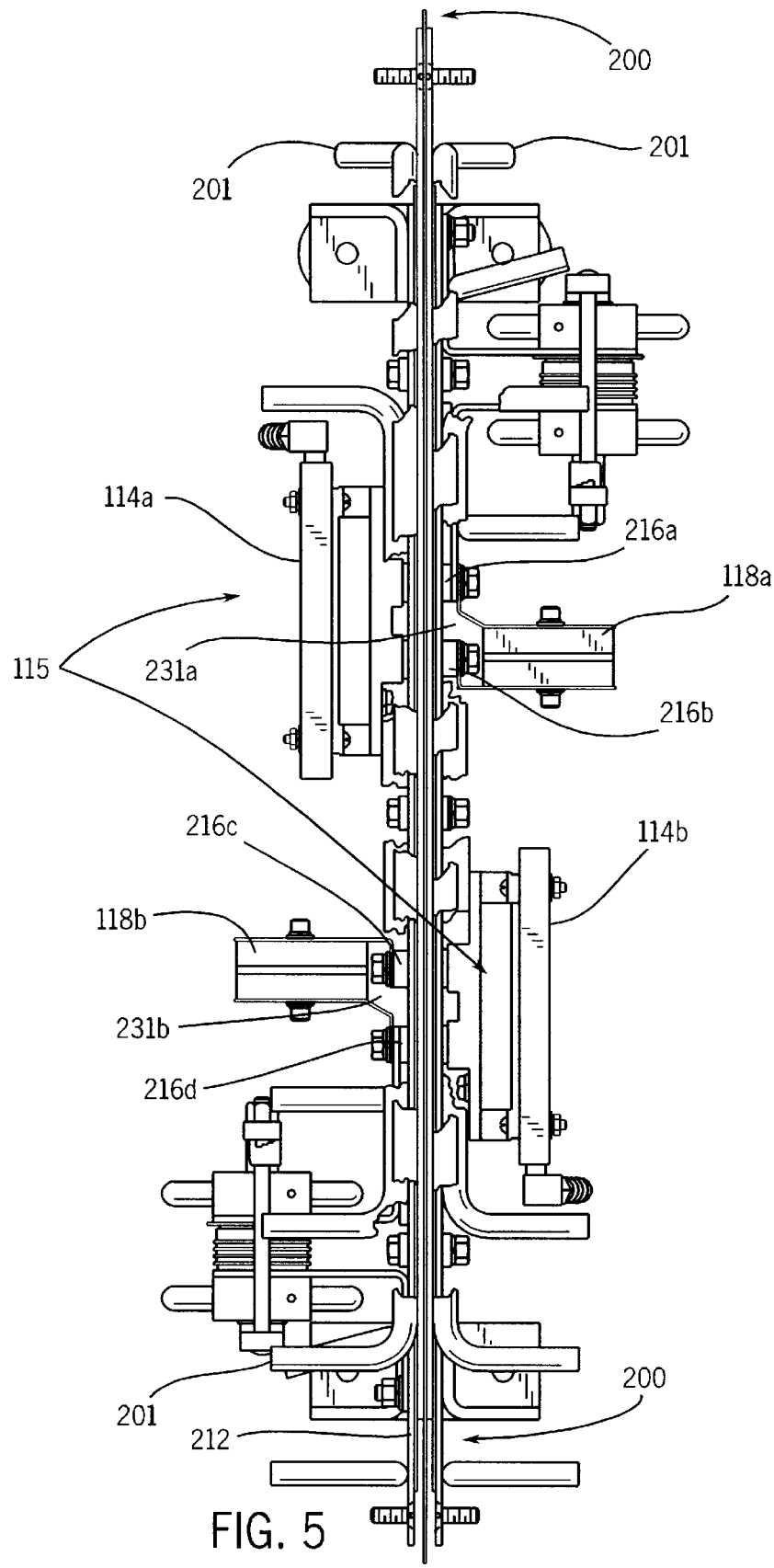
FIG. 5 shows an embodiment of a physical implementation of the snubber circuit in accordance with the present invention.

Referring now to FIG. 5, a partial side view of a power distribution panel in an induction heating apparatus having an embodiment of the physical structure of the snubber circuit of the present invention is shown. Various cooling tubes 201 run throughout the panel and are cut away to facilitate understanding. A power bus 200 runs immediately through the snubber circuit assembly and comprises four conducting plates 212. Each of the capacitors 118a–b and switches 114a–b receives power via the power bus 200 by one of conducting layers 212.

In the embodiment shown, exemplary switches 114a and 114b are located on opposing sides of power bus 200. Likewise, capacitors 118a and 118b are on opposing sides of power bus 200. The combination of switches 114a and 114b form bi-directional switch 115. Switch 114a and capacitor 118a are joined together by connectors 216a and 216b and are mounted on opposite sides of power bus 200 to form cavity 231a. Similarly, switch 114b is connected to capacitor 118b through connectors 216c–d and are mounted on opposite sides of power bus 200 to form cavity 231b. Inductive coupling elements (120a–b of FIG. 1) are insertable into cavities 231a–b to inductively couple the resistor (122a–b of FIG. 1) to the branch circuits which include capacitors 118a and 118b.

Figure 6:
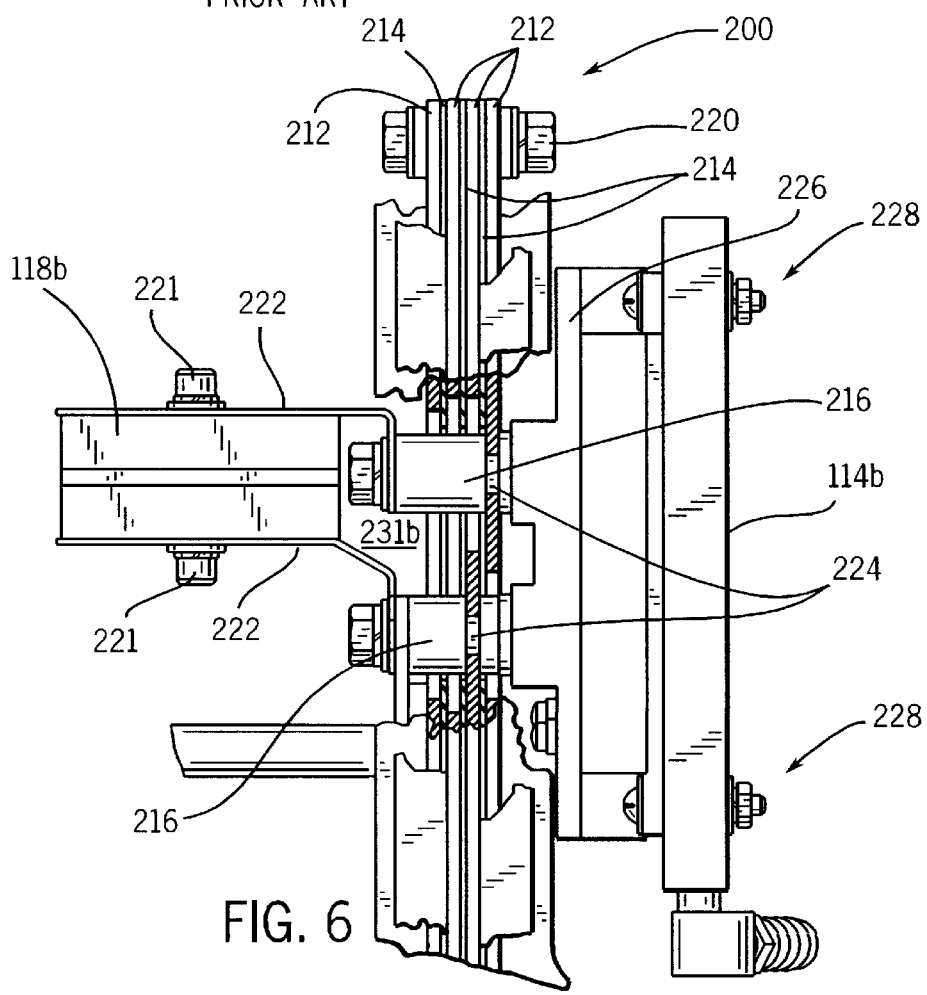
FIG. 6 shows an enlarged view of a portion of FIG. 5 showing the capacitor and switching connections to the power bus.

FIG. 6 is a detailed view of a portion of FIG. 5 illustrating the physical implementation of switch 114b and capacitor 118b in further detail. It is to be understood that similar connections are made with respect to switch 114a and capacitor 118a. Power bus 200 comprises four conducting plates or layers 212, with each adjacent conducting plate or layer separated by an insulating layer 214. The layers are secured together as by retainers 220. Capacitor 118b is sandwiched between leads 222 and retained by retainer 221. Leads 222 are each connected to connectors 216. Connectors 216 each include a conducting core 224, each conducting core 224 in direct electrical contact with one of the conducting layers 212. Switching device 114b is likewise in contact with connectors 216 via base 226, which is attached to the switch as by nut and bolt assemblies 228. The physical implementation preferably includes placing or sandwiching each air core transformer between the terminals of each capacitor 118a and 118b.

A method of dampening oscillations in a power inverter switching circuit having at least one switch to direct power is also contemplated by the present invention. The method includes connecting a branch circuit to the at least one switch, with the branch circuit having capacitance in parallel with the current flow through the switch, and inductively connecting a resistor having a discrete value to the branch circuit so that the resistance induced in the branch circuit is less than the discrete value of the resistor to dampen circuit oscillations. Preferably, the step of inductively coupling the resistor to the snubber circuit includes positioning an air core transformer in close physical proximity to the branch circuit.

The present invention has been described in terms of the preferred embodiment, and it is recognized that equivalents, alternatives, and modifications, aside from those expressly stated, are possible and within the scope of the appending claims.

I claim:

1. A snubber circuit comprising:
   at least one switch having at least two terminals defining a current path therethrough;
   a branch circuit connected across the current path of the at least one switch;
   a snubber capacitor connected in parallel with the at least one switch in the branch circuit;
   an inductive coupling element inductively coupled to the branch circuit to permit coupling in series with the snubber capacitor; and
   a resistor connected to the inductive coupling element such that the inductive coupling element inductively couples the resistor to the branch circuit thereby dampening electrical oscillations within the snubber circuit.

2. The snubber circuit of claim 1 wherein the at least one switch includes a bidirectional switch connected in parallel with a heating coil to direct and divert power to sections of the heating coil.

3. The snubber circuit of claim 2 wherein the bidirectional switch comprises a pair of switching transistors, each switching transistor having the snubber capacitor in parallel therewith in the branch circuit, and each switching transistor having a resistor inductively coupled to each branch circuit.

4. The snubber circuit of claim 3 wherein the switching transistors are mounted to a power bus having a plurality of conducting plates, each switching transistor of the bidirectional switches is electrically connected to one conducting plate, and wherein the snubber capacitor is mounted to an opposite side of the power bus in direct alignment with the respective switching transistor to form a cavity between the snubber capacitor and the power bus to allow insertion of the inductive coupling element therebetween.

5. The snubber circuit of claim 4 further comprising a plurality of bidirectional switches to selectively control temperature in the heating coil.

6. The snubber circuit of claim 1 wherein the switch is an insulated gate bi-polar transistor.

7. The snubber circuit of claim 1 wherein the coupling element is an air core transformer in close physical proximity to the branch circuit.

8. The snubber circuit of claim 1 wherein the coupling element is a conducting wire winding in close physical proximity to the branch circuit.

9. The snubber circuit of claim 7 wherein the air core transformer has a primary winding to secondary winding ratio that is less than one.

10. The snubber circuit of claim 1 wherein the value of the resistor is approximately 20 ohms.

11. The snubber circuit of claim 1 wherein the resistor is remotely positioned from the snubber capacitor in the branch circuit such that the resistor adds substantially no inductance to the snubber circuit.

12. The snubber circuit of claim 1 wherein the snubber circuit is operated at a frequency above 25 kHz.

13. The snubber circuit of claim 1 wherein the inductive coupling element and the resistor induce a series resistance with the snubber capacitor in the branch circuit, and wherein the induced series resistance is substantially in the range of 0.2 to 0.5 ohms.

14. A snubber circuit for reducing electrical oscillations in a power inverter comprising:

a bidirectional switch;

at least one snubber capacitor in parallel with the bidirectional switch;

at least one coupling element in close physical proximity to a branch circuit including the at least one snubber capacitor; and at least one resistor connected to the at least one coupling element such that the at least one coupling element couples the at least one resistor to the branch circuit to induce a resistance in series with the at least one snubber capacitor.

15. The snubber circuit of claim 14 wherein the bidirectional switch comprises a pair of switching transistors, each switching transistor having a snubber capacitor in parallel therewith in a branch circuit, and each switching transistor having a resistor inductively connected to each branch circuit.

16. The snubber circuit of claim 15 wherein the switching transistors are mounted to a power bus having a plurality of conducting plates, each switching transistor of the bidirectional switches is electrically connected to one conducting plate, and wherein the snubber capacitor is mounted to an opposite side of the power bus in direct alignment with the respective switching transistor to form a cavity between the snubber capacitor and the power bus to allow insertion of the inductive coupling element therebetween.

17. The snubber circuit of claim 14 wherein the switch is an insulated gate bi-polar transistor.

18. The snubber circuit of claim 14 wherein the coupling element is a conducting wire winding.

19. The snubber circuit of claim 14 wherein the coupling element is an air core transformer.

20. The snubber circuit of claim 19 wherein the air core transformer has a primary winding to secondary winding ratio that is less than one.

21. The snubber circuit of claim 14 wherein the value of the resistor is approximately 20 ohms.

22. The snubber circuit of claim 14 wherein the resistor is remotely positioned from the capacitor such that the resistor adds substantially no inductance to the snubber circuit.

23. The snubber circuit of claim 14 wherein the snubber circuit is operated at a frequency above 25 kHz.

24. The snubber circuit of claim 14 wherein the induced resistance in series with the snubber capacitor is substantially in the range of 0.2 to 0.5 ohms.

25. An inverter comprising:

a power source; and a snubber circuit connected to the power source, comprising:
a plurality of transistor switches;
a capacitor in parallel with each transistor switch;
a coupling element disposed in close physical proximity to a branch circuit having the capacitor therein; and
a resistor connected to each coupling element such that the coupling element induces a resistance in series with each capacitor.

26. The inverter of claim 25 wherein the capacitor and the power source define a space therebetween and wherein the coupling element is insertable into the space between the capacitor and the power source to inductively couple the resistor to a branch circuit having the capacitor.

27. The inverter of claim 25 wherein the transistor switches are attached to opposite sides of the power source.

28. The inverter of claim 25 wherein the capacitors are attached to opposite sides of the power source.

29. The snubber circuit of claim 25 wherein the power source includes a plurality of power bus conducting plates and a plurality of insulating layers in an alternating parallel configuration.

30. The snubber circuit of claim 25 wherein each of the transistor switches and each of the capacitors are connected to a pair of the power bus conducting plates.

31. A method of dampening oscillations in a power inverter switching circuit having at least one switch to direct power comprising the steps of:

connecting a branch circuit to the at least one switch, the branch circuit having capacitance in parallel with the current flow through the switch; and inductively coupling a resistor having a discrete value to the branch circuit such that a resistance is induced in the branch circuit in series with the capacitance that is less than the discrete value of the resistor, thereby dampening circuit oscillations.

32. The method of claim 31 wherein inductively coupling the resistor includes positioning an air core transformer in close physical proximity to the branch circuit.

* * * * *